(12) United States Patent
Tao et al.

(10) Patent No.: US 10,438,068 B2
(45) Date of Patent: Oct. 8, 2019

(54) ADAPTING TO APPEARANCE VARIATIONS OF A TARGET OBJECT WHEN TRACKING THE TARGET OBJECT IN A VIDEO SEQUENCE

(71) Applicant: QUALCOMM Incorporated, San Diego, CA (US)

(72) Inventors: Ran Tao, Amsterdam (NL); Efstratios Gavves, Amsterdam (NL); Arnold Wilhelmus Maria Smeulders, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/030,685

(22) Filed: Jul. 9, 2018

(65) Prior Publication Data

US 2018/0314896 A1 Nov. 1, 2018

Related U.S. Application Data

(63) Continuation of application No. 15/192,935, filed on Jun. 24, 2016, now Pat. No. 10,019,631.

(60) Provisional application No. 62/251,544, filed on Nov. 5, 2015.

(51) Int. Cl.
*G06K 9/00* (2006.01)
*G06K 9/32* (2006.01)
*G06N 3/04* (2006.01)
*G06T 7/246* (2017.01)
(Continued)

(52) U.S. Cl.
CPC ....... *G06K 9/00758* (2013.01); *G06K 9/3241* (2013.01); *G06K 9/4628* (2013.01); *G06K 9/6234* (2013.01); *G06N 3/04* (2013.01); *G06T 7/246* (2017.01); *G06T 7/248* (2017.01); *G06K 2009/3291* (2013.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 7,689,520 B2 * | 3/2010 | Burges ............. G06F 17/30864 706/12 |
| 7,831,094 B2 | 11/2010 | Gupta et al. |
| 8,073,197 B2 | 12/2011 | Xu et al. |

(Continued)

OTHER PUBLICATIONS

Naiyan Wang et al: "Learning a Deep Compact Image Representation for Visual Tracking", Jan. 1, 2013 (Jan. 1, 2013), XP055326534, in IDS filed Feb. 21, 2017.*

(Continued)

*Primary Examiner* — Tahmina N Ansari
(74) *Attorney, Agent, or Firm* — Seyfarth Shaw LLP

(57) ABSTRACT

A method of tracking a position of a target object in a video sequence includes identifying the target object in a reference frame. A generic mapping is applied to the target object being tracked. The generic mapping is generated by learning possible appearance variations of a generic object. The method also includes tracking the position of the target object in subsequent frames of the video sequence by determining whether an output of the generic mapping of the target object matches an output of the generic mapping of a candidate object.

21 Claims, 8 Drawing Sheets

(51) Int. Cl.
*G06K 9/46* (2006.01)
*G06K 9/62* (2006.01)

(56) References Cited

U.S. PATENT DOCUMENTS

| | | | |
|---|---|---|---|
| 8,351,649 | B1 | 1/2013 | Medioni et al. |
| 8,718,324 | B2 | 5/2014 | Fan |
| 10,019,631 | B2 | 7/2018 | Tao et al. |
| 2007/0288452 | A1 | 12/2007 | Podilchuk |
| 2010/0166260 | A1* | 7/2010 | Huang ............... G06K 9/00771 382/103 |
| 2011/0161071 | A1* | 6/2011 | Duong-van ....... G06F 17/30867 704/9 |
| 2015/0125049 | A1* | 5/2015 | Taigman ............ G06K 9/00268 382/118 |
| 2016/0203374 | A1* | 7/2016 | Zeng .................... G01S 13/726 382/104 |
| 2016/0350336 | A1* | 12/2016 | Checka ............. G06F 17/30268 |
| 2017/0132472 | A1* | 5/2017 | Tao .................... G06K 9/00758 |

OTHER PUBLICATIONS

Hadsell R., et al., "Dimensionality Reduction by Learning an Invariant Mapping," Conference On Computer Vision And Pattern Recognition, 2006 IEEE Computer Society, New York, NY, USA, Jun. 17-22, 2006, IEEE, Piscataway, NJ, USA, Jun. 17, 2006 (Jun. 17, 2006), vol. 2,pp. 1735-1742, XP010922992, DOI: 10.1109/CVPR.2006.100 ISBN: 978-0-7695-2597-6 abstract section 3.1 Training Architecture.
Hong S., et al., "Online Tracking by Learning Discriminative Saliency Map with Convolutional Neural Network," Feb. 24, 2015 (Feb. 24, 2015), XP055326462, Retrieved from the Internet: URL:http://www.jmlr.org/proceedings/papers /v37/hong15.pdf [retrieved on Dec. 6, 1922] abstract; figure 1 p. 2, right-hand column, paragraph first section 3.1. Pre-Trained CNN for Feature Descriptor, 10 pages.
International Search Report and Written Opinion—PCT/US2016/055735—ISA/EPO—dated Dec. 19, 2016.
Wang N., et al., "Learning a Deep Compact Image Representation for Visual Tracking," Jan. 1, 2013 (Jan. 1, 2013), XP055326534, Retrieved from the Internet: URL:http://papers.nips.cc/paper/5192-learn ing-a-deep-compact-image-representation-for-visual-tracking. pdf [retrieved on Dec. 6, 2016] abstract sections: 1 Introduction; 3 The DLT Tracker; 3.1.1 Dataset and Preprocessing; 3.2 Online Tracking Process, 9 pages.

* cited by examiner

ADAPTING TO APPEARANCE VARIATIONS OF A TARGET OBJECT WHEN TRACKING THE TARGET OBJECT IN A VIDEO SEQUENCE

CROSS-REFERENCE TO RELATED APPLICATION

The present application is a continuation of U.S. patent application Ser. No. 15/192,935, filed on Jun. 24, 2016, and titled "ADAPTING TO APPEARANCE VARIATIONS WHEN TRACKING A TARGET OBJECT IN VIDEO SEQUENCE," which claims the benefit of U.S. Provisional Patent Application No. 62/251,544, filed on Nov. 5, 2015, and titled "GENERIC MAPPING FOR TRACKING TARGET OBJECT IN VIDEO SEQUENCE," the disclosures of which are expressly incorporated by reference herein in their entireties.

BACKGROUND

Field

Certain aspects of the present disclosure generally relate to machine learning and, more particularly, to improving systems and methods of tracking a target object in a video sequence.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect of the present disclosure, a method of tracking a position of a target object in a video sequence is presented. The method includes identifying the target object in a reference frame. The method also includes applying a generic mapping to the target object being tracked. The generic mapping is generated by learning possible appearance variations of a generic object. The method further includes tracking the position of the target object in subsequent frames of the video sequence by determining whether an output of the generic mapping of the target object matches an output of the generic mapping of a candidate object.

In another aspect of the present disclosure, an apparatus for tracking a position of a target object in a video sequence is presented. The apparatus includes a memory and at least one processor coupled to the memory. The one or more processors are configured to identify the target object in a reference frame. The processor(s) is(are) also configured to apply a generic mapping to the target object being tracked. The generic mapping is generated by learning possible appearance variations of a generic object. The processor(s) is(are) further configured to track the position of the target object in subsequent frames of the video sequence by determining whether an output of the generic mapping of the target object matches an output of the generic mapping of a candidate object.

In yet another aspect of the present disclosure, an apparatus for tracking a position of a target object in a video sequence is presented. The apparatus includes means for identifying the target object in a reference frame. The apparatus also includes means for applying a generic mapping to the target object being tracked. The generic mapping is generated by learning possible appearance variations of a generic object. The apparatus further includes means for tracking the position of the target object in subsequent frames of the video sequence by determining whether an output of the generic mapping of the target object matches an output of the generic mapping of a candidate object.

In still another aspect of the present disclosure, a non-transitory computer readable medium is presented. The non-transitory computer readable medium has encoded thereon program code for tracking a position of a target object in a video sequence. The program code is executed by a processor and includes program code to identify the target object in a reference frame. The program code also includes program code to apply a generic mapping to the target object being tracked. The generic mapping is generated by learning possible appearance variations of a generic object. The program code further includes program code to track the position of the target object in subsequent frames of the video sequence by determining whether an output of the generic mapping of the target object matches an output of the generic mapping of a candidate object.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
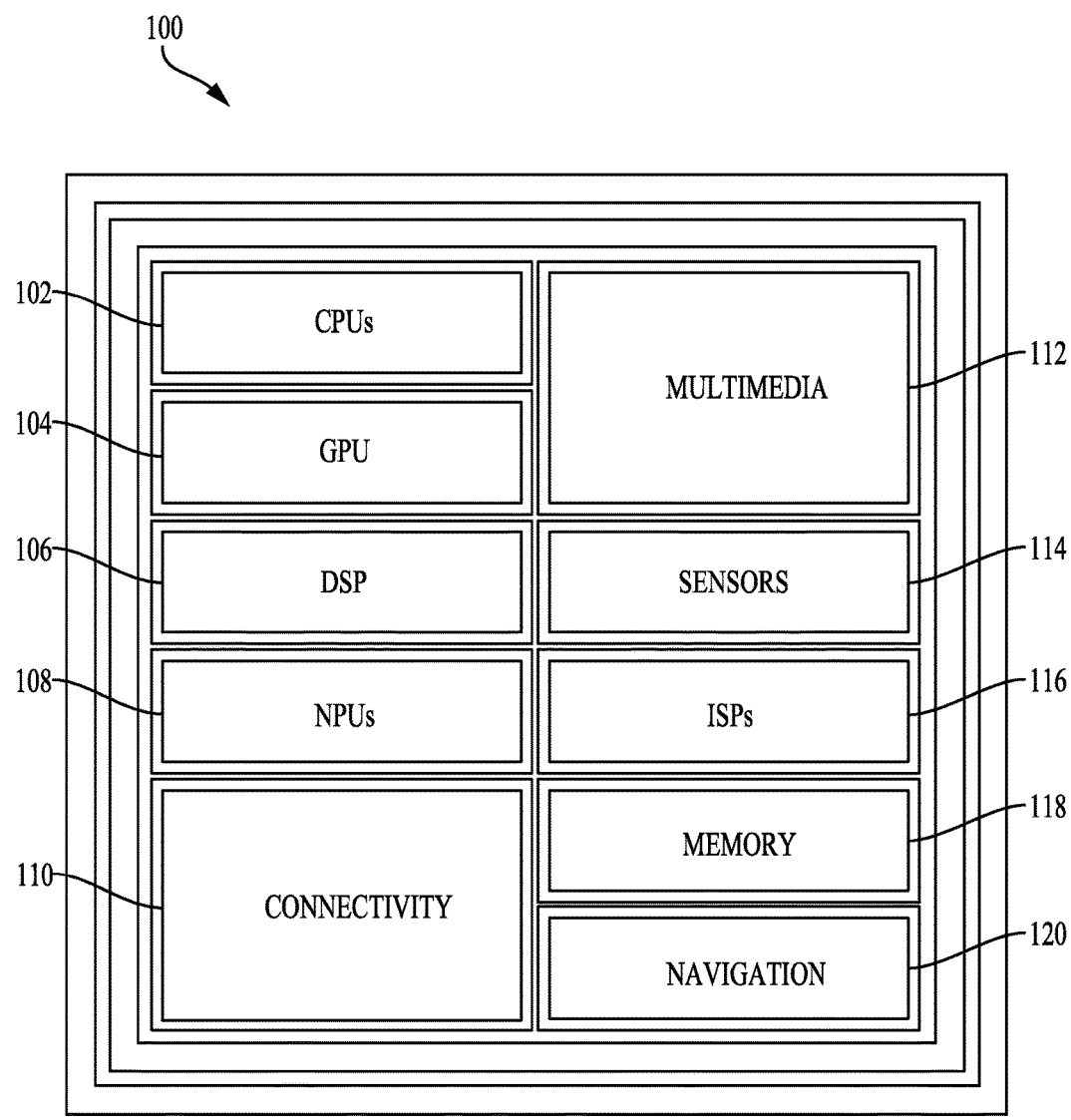
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

An object is an entity in the physical world, which may also refer to the appearance in an image.

An instance is a specific object, which may also refer to the appearance in the image.

An image patch is a part or portion of an entire image covered by a rectangular box (e.g., a bounding box).

In tracking, a target, target object, or target instance, is the instance selected to track for the video sequence under processing.

An instance search is the task of searching for the same instance regardless of its appearance variations (e.g., partially occluded).

A mapping function is a function that maps points from one space to another space. In accordance with aspects of the present disclosure, the mapping function takes as input, pixel values of an image and produces as output a representation of the image. The representation may comprise a multi-dimensional vector, which is a point in the corresponding multi-dimensional space, for instance.

A matching function is a function that compares two images. Matching involves mapping the images to a latent space and then comparing two points in the latent space based on a distance computation (e.g., Euclidean distance).

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Tracking Target Objects

Tracking models utilize various functions to match a target object in a frame of a video sequence to images of the target in upcoming frames of the video sequence. That is, tracking follows an instance. In most tracking models, the model based on the target object from the first frame does not account for future appearance changes. Rather, sequential model updating is utilized to adapt to changes in appearance of the target object in the upcoming frames of a video sequence.

Conventional tracking models are also negatively impacted by incoming data and eventually drift. In drifting, gradual false model updates introduce parts of the background as if it is the foreground target. As a consequence, the tracking model may track something different from the target.

An online matching function may be utilized to explicitly adapt for distortions and appearance variations of the target. In particular, each possible cause of distortion affecting the target appearance may be modelled and used by the matching function to adapt for various distortions and appearance variations. However, while one mechanism may be well-fitted for one type of distortion, the mechanism is likely to perform differently with other distortion types. Aspects of the present disclosure are directed to teaching a matching mechanism to be invariant to distortions. In particular, a deep convolutional network may learn, offline, a generic mapping based on possible appearance variations from separate videos or images and then apply the generic mapping to novel tracking settings.

According to the present disclosure, distortion variances are learned externally from separate videos or images, and then applied to novel tracking settings. Starting from external data that contain numerous types of variations and do not overlap with the novel tracking videos, the matching function may be improved or even optimized, between an arbitrary target object and candidate patches from subsequent frames. Once the matching function has been learned on the external data, it can be directly used with all new tracking videos of previously unseen target objects without further adaptation. Alternatively, if desired, the matching function may be adapted to better fit the target instances.

FIG. 1 illustrates an example implementation of the aforementioned object tracking using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for identifying the target object in a reference frame. The instructions loaded into the general-purpose processor 102 may also comprise code for applying a generic mapping to the target object being tracked. The generic mapping is generated by learning possible appearance variations of a generic object. The instructions loaded into the general-purpose processor 102 may further comprise code for tracking a position of the target object in subsequent frames of the video sequence by determining whether an output of the generic mapping of the target object matches an output of the generic mapping of a candidate object.

Figure 2:
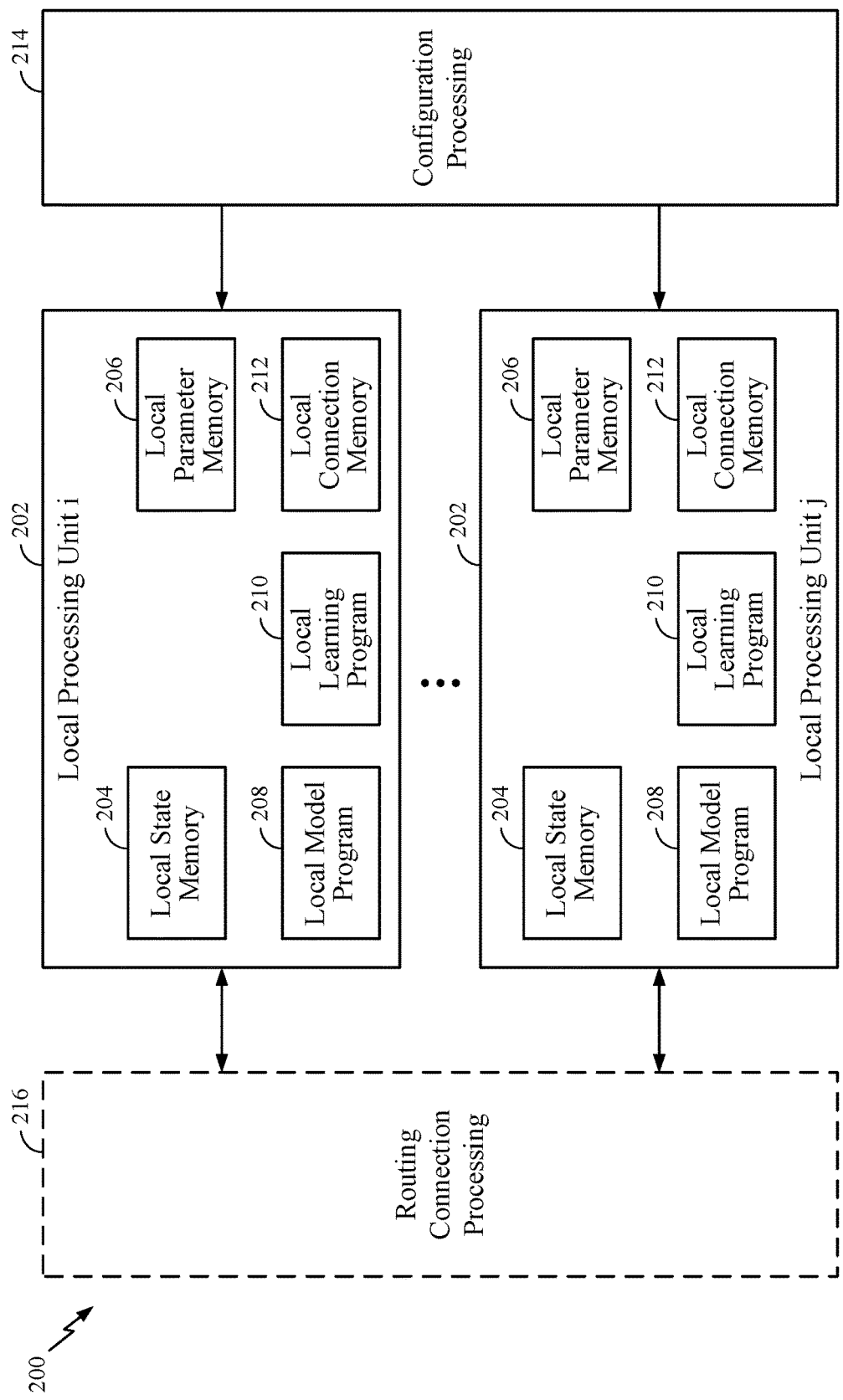
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low level features of an input.

Figure 3A:
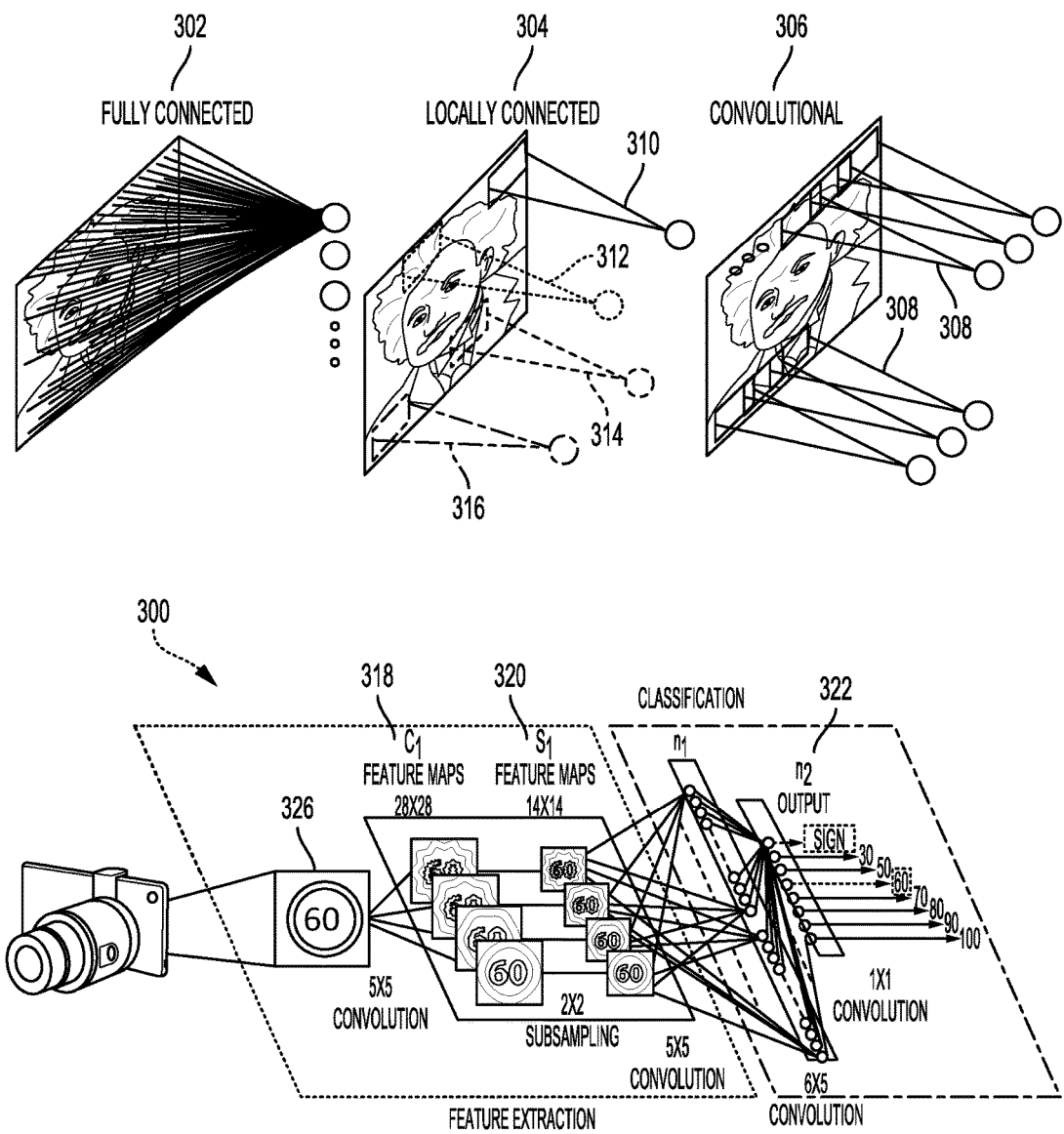
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
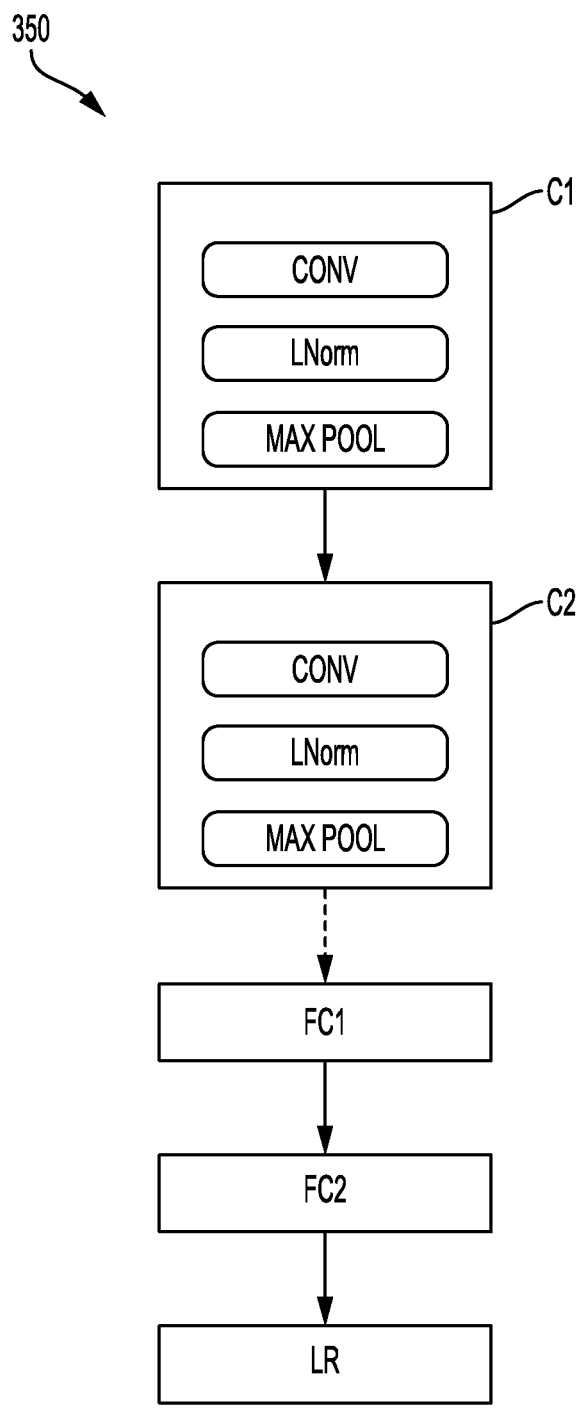
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
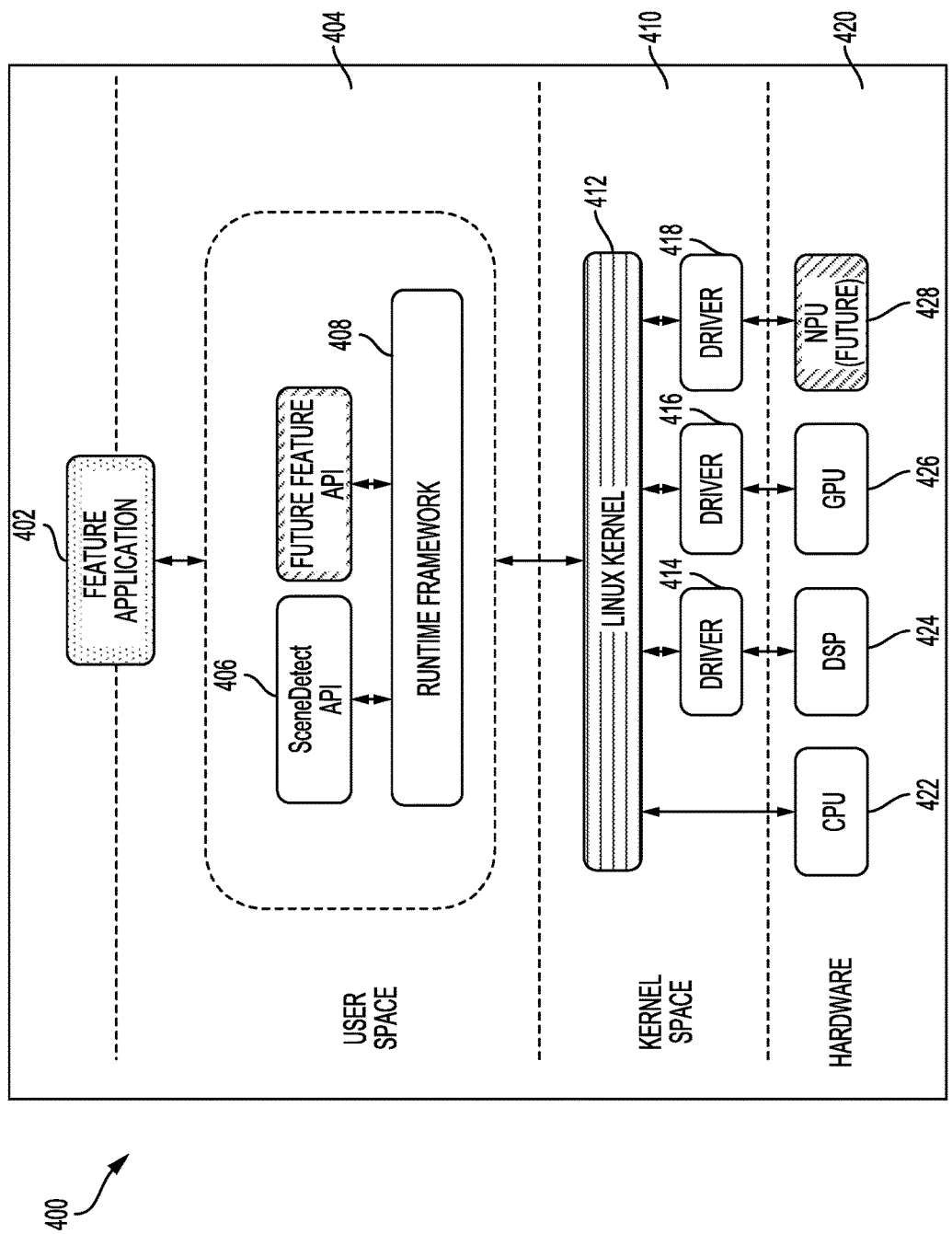
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
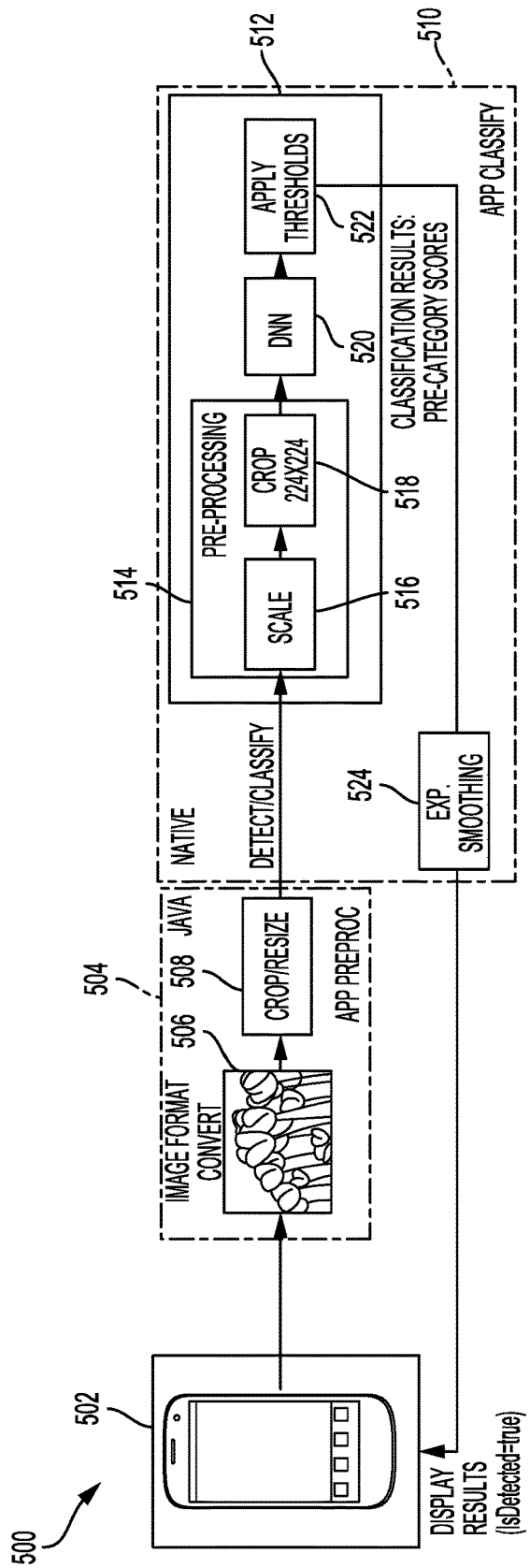
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Generic Mapping for Tracking

Tracking models utilize various functions to match a target object in a frame of a video sequence to images of the target in upcoming frames of the video sequence. For example, the most basic concept of tracking includes the direct matching between the intensity values of pixels of the initial target box and patches taken from the incoming image. A matching-based tracking model may focus on various distortions encountered in tracking. In particular, the target object may appear differently in upcoming frames as compared to a reference frame of the target (which may be the first frame). For example, the target object may become occluded, change in scale, and/or rotate in and out-of-plane. Additionally, changes in illumination and camera angle may also impact the appearance of the target object. A matching function may be utilized to track and match the target object in upcoming frames of the video sequence in view of possible distortion and appearance variations.

In most tracking models, the initial model taken from the first frame does not account for future appearance changes. Rather, sequential model updating is utilized to adapt to changes in the appearance of the target object in the upcoming frames of a video sequence. Additionally, a model of each and every possible cause of distortion affecting the target appearance may be utilized by a matching mechanism to explicitly adapt for distortions and appearance variations of the target. However, while one mechanism is well-fitted for one type of distortion, the mechanism is likely to perform differently with other distortion types.

Aspects of the present disclosure are directed to utilizing a generic mapping mechanism for tracking a target object in a video sequence. In particular, the generic mapping is generated based on offline learning of appearance variations, such as, but not limited to scale changes, illumination variations, etc. The appearance variations may be learned from offline videos. For example, the appearance variations may be learned from a set of videos in a video repository (e.g., 300 video sequences). The offline learning may be used to learn how the appearance of an object (e.g., a moving object) may transition from one frame to the next in a video sequence. In one aspect, the training videos include external data containing many types of appearance variations and do not overlap with novel tracking videos. That is, the learned appearance variations are based on generic objects rather than the specific object (same object). The training videos may not even include examples of the same class of objects as the class to which the target object belongs. For instance, the learned appearance variations of a car may be applied to determine how a truck may appear from one frame to the next in a video sequence. Once the matching function has been trained on the external data, the mapping function may be used with new tracking videos of previously unseen target objects.

In another aspect, the matching function may be trained to learn only typical tracking variations (based on typical appearance variations and distortion). The resulting generic mapping function is not a full-fledged tracker, with highly intelligent model update mechanisms, etc. For example, in one aspect, at each frame in a video sequence, the candidate patches are compared with a target object from a reference frame, without relying on the predictions of the previous frames for model updating.

Aspects of the present disclosure are directed to a method of tracking a target object in a video sequence, where a machine learning model is trained to learn matching functions on external, separate data (e.g., offline), instead of manually modelling the matching variations on-the-fly. The training is performed offline on completely separate data. In some aspects, the target object, similar objects or similar categories of object may be absent from the external data. That is, because the mapping function learns generic appearance variations of an object, target objects may be tracked even where the external data does not include the same object, similar objects, or even objects in the same or a similar category as the tracking videos, for use later. Accordingly, the resulting generic mapping is applied to new tracking videos and new target objects, regardless of the object appearance or class type.

In another aspect, a neural network having a Siamese architecture is utilized to model and train the generic mapping. The customized network is trained to recognize whether two image patches depict the same object. Optionally, the customized network may be configured to perform matching from different object viewpoints (e.g., from the frontal view of the car to the side view of the car).

In one aspect, the machine learning model is trained to learn tracking invariances. In one example, two sets of data are assumed: $X=\{X^i\}$, i=1, ..., D and $Z=\{Z^i\}$, i=1, ..., D, such that $X^i=\{x_j^i\}$, j=1, ..., T are frames of a particular object in a video. Because in the learning set the ground truth locations of an instance in a video are known, the identity of the object can be certain regardless of the variations in the viewing conditions (e.g., scale changes, illumination differences, deformations, etc.) Given the available training data, the model $f(\cdot; \theta)$ with parameters $\theta$, may be improved or in some cases optimized, for example, according to the following:

$$\min L(f(x_j^i;\theta), f(x_k^i;\theta), y_{jk}) \forall j, k \quad (1)$$

where $y_{jk} \in \{0, 1\}$ is a label indicating whether $x_j$ and $x_k$ refer to the same instance, whereas $L(\cdot)$ is a loss function measuring how well $f(\cdot; \theta)$ can map different images of the same instance to a similar part of the space. An instance is defined as a specific object, and may also refer to the appearance thereof in an image.

Optimizing the loss L on the dataset X alone may result in generalization issues, because the extent to which a representation is invariant or simply over-fit is not known. The parameters may be optimized using X, while Z serves as a validation set to monitor the generalization capacity of the learned model.

A second separate dataset Z is utilized to reliably learn the tracking invariances. To determine the final invariance model, the performance of the invariance model in both datasets X, Z is improved or optimized. Those skilled in the art will appreciate a variety of methods may be employed to perform the optimization. For illustrative purposes only, the following example is provided where X is the training set where $\theta$ is improved or even optimized, while Z is the validation set where the generalization capacity of the network is monitored.

To learn invariances, a model that operates on pairs of image patches, $(x_j, x_k)$ is utilized. In some aspects, a customized Siamese network may be utilized to operate on the image patch pairs. Siamese networks generally include two identical subnetworks that are joined at the outputs. The customized Siamese network may be constructed on top of a convolutional neural network such as DCN 350, for example.

Figure 6:
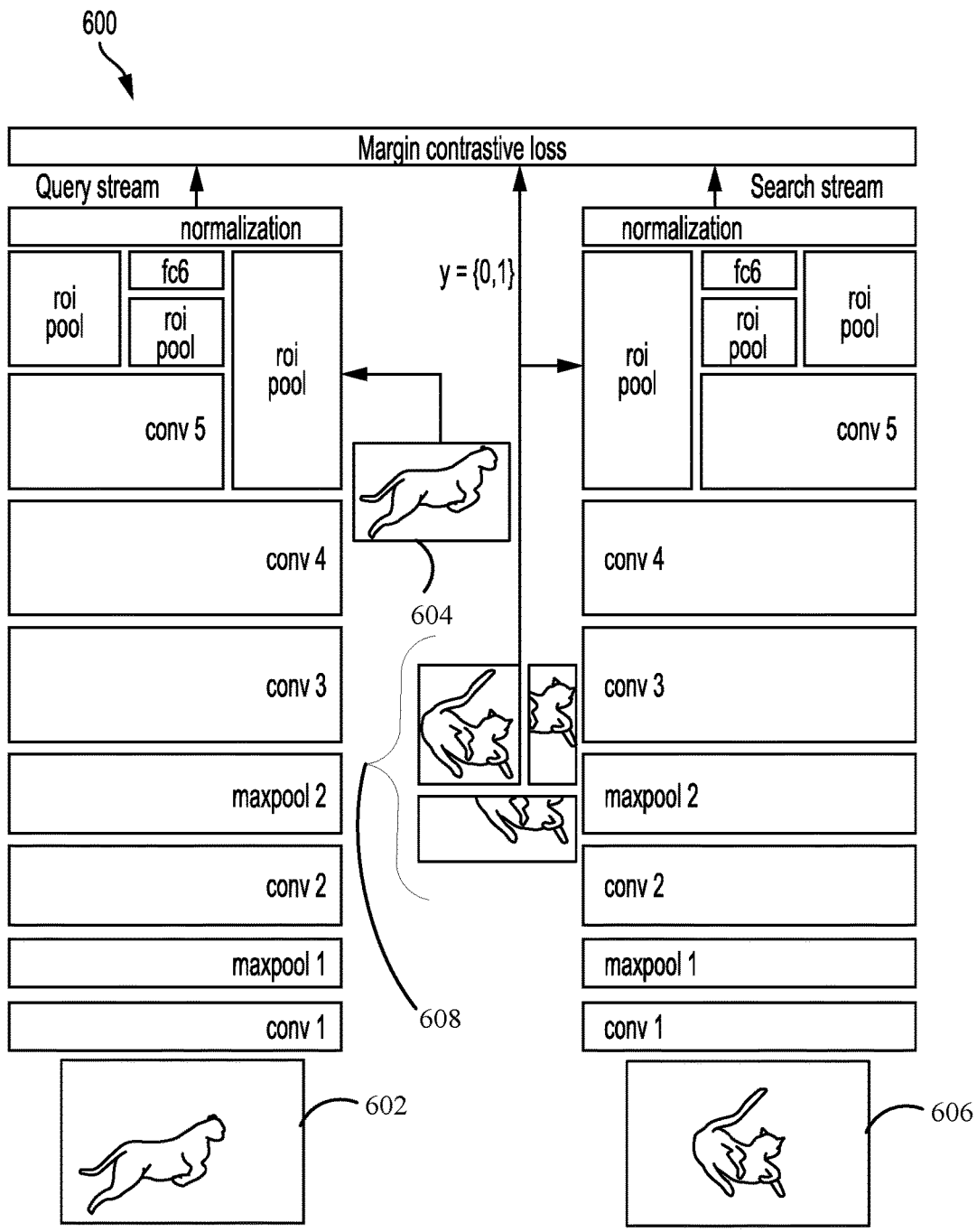
FIG. 6 is a diagram illustrating an exemplary Siamese network in accordance with aspects of the present disclosure.

FIG. 6 is a diagram illustrating an exemplary modified Siamese network 600 in accordance with aspects of the present disclosure. Referring to FIG. 6, the network 600 includes two branches (e.g., Query Stream and Search Stream). Each branch of the network 600 may take the form of a convolutional neural network. In some aspects, the two branches of the network 600 of FIG. 6 may have the same structure and parameter values such that they perform the same operation. Of course, this is merely exemplary and the two branches may also be differentially configured. Each branch may receive and process a separate input. In turn, the individual branches of the network 600 generate a generic mapping used for tracking unknown target objects. The individual branches of the network 600 (e.g., Query Stream and Search Stream) may operate as a mapping function, while the network 600 may operate as the matching function. In the layer connecting the two branches, there is a distance comparison.

As shown in FIG. 6, each branch of the network may be configured with one or more convolutional layers (e.g., conv 1, cony 2, cony 3, cony 4), max pooling layers (e.g., maxpool 1, maxpool 2), and/or region pooling layers (e.g., region of interest pooling shown as roi pool). The number of and types of layers is exemplary and non-limiting. The network 600 may also include a loss layer (e.g., margin contrastive loss).

The max pooling layers maintain only the strongest of the activations (e.g., highest activation value) from a local neighborhood to use as input for the subsequent layers. As such, the spatial resolution of the activation inputs is aggressively reduced (e.g., by 50% in the simple case of 2×2 of local neighborhoods). In some aspects, the max pooling layers may be selectively removed so that pixel level accuracy may be considered. In one exemplary aspect, max pooling layers of a standard convolutional network that maintain invariance to noise may be retained and the other max pooling layers may be removed.

In tracking, several hundreds of candidate locations may be evaluated for the next frame. Parsing through the candidate locations independently may result in severe computational overhead. To overcome the computational overhead, the modified Siamese network employs a region pooling layer (e.g., roi pooling) for the fast processing of multiple overlapping regions.

Each branch of the network 600 receives, as input, one entire frame (e.g., 602, 606) and a set of patches specified by rectangles (e.g., 604, 608). In the example of FIG. 6, two images are supplied as inputs (602, 606). Each of the inputs depicts an animal of the Felidae family (e.g., lion or leopard) from a different perspective (e.g., side or rear). The network 600 may, for example, process the entire image for a few layers. Next, the region pooling layer converts the feature map from a particular region into a fixed-length representation, and next the subsequent layers are processed.

Notably, the layers in a deep network may progressively capture representations that are more abstract. The filters of the lower layers may be activated by lower level visual patterns, such as edges and angles. Higher layers are generally activated by more complex patterns, such as faces and wheels. Additionally, the deeper the layer, the more invariant the layer is to appearance variations and also the less discriminative it is, especially for instance-level distinction.

In tracking, the type of the target object being tracked is generally not known. In other words, it is not known whether the target object is highly textured with low level patterns or not. Accordingly, in one aspect, the outputs from multiple layers are used as the intermediate feature representation that is then fed to a loss function. That is, multiple layers are used for feature extraction. All activations can be locally pooled using the region pooling layers.

Conventional convolutional neural networks use rectified linear units that do not bound the output values and the nonlinear activations may vary in the range of values produced. Accordingly, the network output and the loss function are heavily influenced by the scale of the generated features and not by their representation quality.

In contrast, in some aspects of the present disclosure, an L2 normalization layer (shown as normalization) may be included in each branch before the loss layer. In one example, the normalization layer may be applied on each of the layer activations that are fed to the loss layer and includes the property of maintaining the direction of the feature, while forcing features from different scales to lie on the same unit sphere (e.g., a set of points one unit from a fixed central point). The parameters of the two convolutional network branches may be tied together (e.g., two branches have identical network structure and parameter values), reducing the danger of overfitting.

The training data includes videos of objects, with known bounding box (or box) locations. In one aspect, the first stream of the network 600 shown in FIG. 6 is the query stream and the second stream is the search stream. For the query stream, one frame from the video is randomly selected. The original box covering the target object available from the ground truth is also used for the query stream. Another video frame is randomly selected for the search stream. Boxes are sampled from the frame of the search stream. The boxes that overlap more than a threshold value ρ+ with the ground truth may be deemed positives. The boxes that overlap less than threshold value ρ− with the ground truth may be deemed negatives. As such, these values may be used to form positive and negative pairs of image patches that may be used for the training.

The two branches of the network 600 are connected with a single loss layer. For tracking, one goal is to obtain a good localization, or in other words, to detect the general location of the target object in a frame (e.g., the new frame). At the same time, it may be desirable to encourage the network to generate representations that are close in the space for image pairs of the same instance while being far away for pairs of different objects. Accordingly, the following margin contrastive loss may be employed:

$$\mathcal{L}_{(x_j, x_k, y_{jk})} = \tfrac{1}{2} y_{jk} D^2 + \tfrac{1}{2}(1 - y_{jk}) \max(0, \in - D^2) \quad (2)$$

where $D = \|f(x_j) - f(x_k)\|$ is the Euclidean distance of two L2 normalized representations, $y_{jk} \in \{0, 1\}$ indicates whether $x_j$ and $x_k$ are the same object, and $\in$ is the minimum distance margin that two images of different objects may satisfy. Although, D is expressed as a Euclidean distance, this is merely exemplary and other distance measures may also be employed.

In operation, each branch of network 600 may takes pixel values of an image patch as input and produces a multi-dimensional vector as the representation of the image. As such, the branches of network 600 may operate as a generic mapping function that maps the pixel values of the image into a representation. The loss (e.g., margin contrastive loss) connecting the two branches (e.g., Query Stream and Search Stream) may be used to guide the learning such that the mapping may generate similar representations for two images (e.g., 602, 606) of the same object while generating different enough (e.g., distinguishable) representations for two images showing different objects.

In one example, several hundreds of candidate boxes (e.g., candidate image patches) may be evaluated to find the location of a target (e.g., leopard) in the next frame. In conventional approaches, the image patches may be supplied independently, one by one, to a branch network. In this way, the conventional branch network only takes one input that is the image patch, fed into a convolution layer. However, this may lead to severe computation overhead, especially because there may be significant overlap between the candidate patches.

The network 600 of FIG. 6 illustrates a more efficient approach, using the region-of-interest pooling layers (roi pool). With the region-of-interest pooling layer, the network 600 takes two inputs (e.g., 602 and 604 or 606 and 608). One input (e.g., 602,606) is the entire frame fed into convolutional layer (conv1), and the other input is the coordinates of the candidate boxes (e.g., 604, 608) fed into the region-of-interest pooling layer (e.g., 604, 608). Each of the branches of network 600 begins processing the entire frame for a few steps, then the region-of-interesting pooling layer converts a feature map covered by a candidate box into a fixed-length representation for further processing. In this way, the network can process hundreds of candidate patches in one single pass through the network.

In another aspect, the application of the generic mapping does not result in model drift and allows for target object recovery:

In aspects of the present disclosure, all invariances are learned on external data and videos that do not appear in the tracking dataset. The data includes enough variations to cover various semantics and do not focus on particular objects. Additionally, the general mapping is not trained to learn explicit types of invariances. In particular, "illumination invariance" is not learned separately from "scale invariance." Accordingly, the external data does not need any specific invariance labels. The bounding box annotations within the video should follow a particular object. The video data should also contain a good amount of variations where the model can learn the invariances desired for the final tracker.

Once the network had been trained to learn invariances offline in the learning phase, the resulting general mapping may be applied to online tracking. One source of reliable data for the target object is its location at the reference frame. Thus, at each frame, the sampled candidate boxes may be compared with the target object at the reference frame. Of course, this is merely exemplary and the sampled candidate boxes may also be compared with a picture of the target object (not in the video sequence) or other source of reliable data. Next, the candidate boxes are passed from the search stream of the customized network and the candidate box most similar to the original target is selected:

$$\hat{x}_t = \arg\min_{x_{j,t}} D(x_{t=0}, x_{j,t}), \quad (3)$$

where $x_{j,t}$ are all the candidate boxes at frames t. Although described with respect to a particular tracking technique, the matching functions learned on external data can also be combined with more sophisticated tracker inference models, which include update and forget mechanisms.

Various techniques may be employed to sample candidate locations. In one aspect, candidate samples are taken around the predicted location of the previous frame. For example, K boxes may be sampled evenly on concentric circles of different radii. Additionally, multiple candidate boxes at different scales may be generated to address scale variations.

A refinement step may be added to improve localization accuracy of the boxes. For example, the predicted bounding box may be refined at each frame using a type of regression, such as ridge regression. The ridge regressors can be trained for the (x, y) coordinates of the box center and the width and height (w, h) of the box based on the first frame. The regressors are not updated during tracking in order to avoid the risk of contaminating the regressors with noisy data. For each frame, the regressors take the representation of the picked candidate box as input and produce a refined box.

In one configuration, a machine learning model identifies the target object in a reference frame. The model also applies a generic mapping to the target object being tracked. The model further tracks the position of the target object in subsequent frames of the video sequence by determining whether an output of the generic mapping of the target object matches an output of the generic mapping of a candidate object. The model includes identifying means, applying means, and/or tracking means. In one aspect, the identifying means, applying means, and/or tracking means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Figure 7:
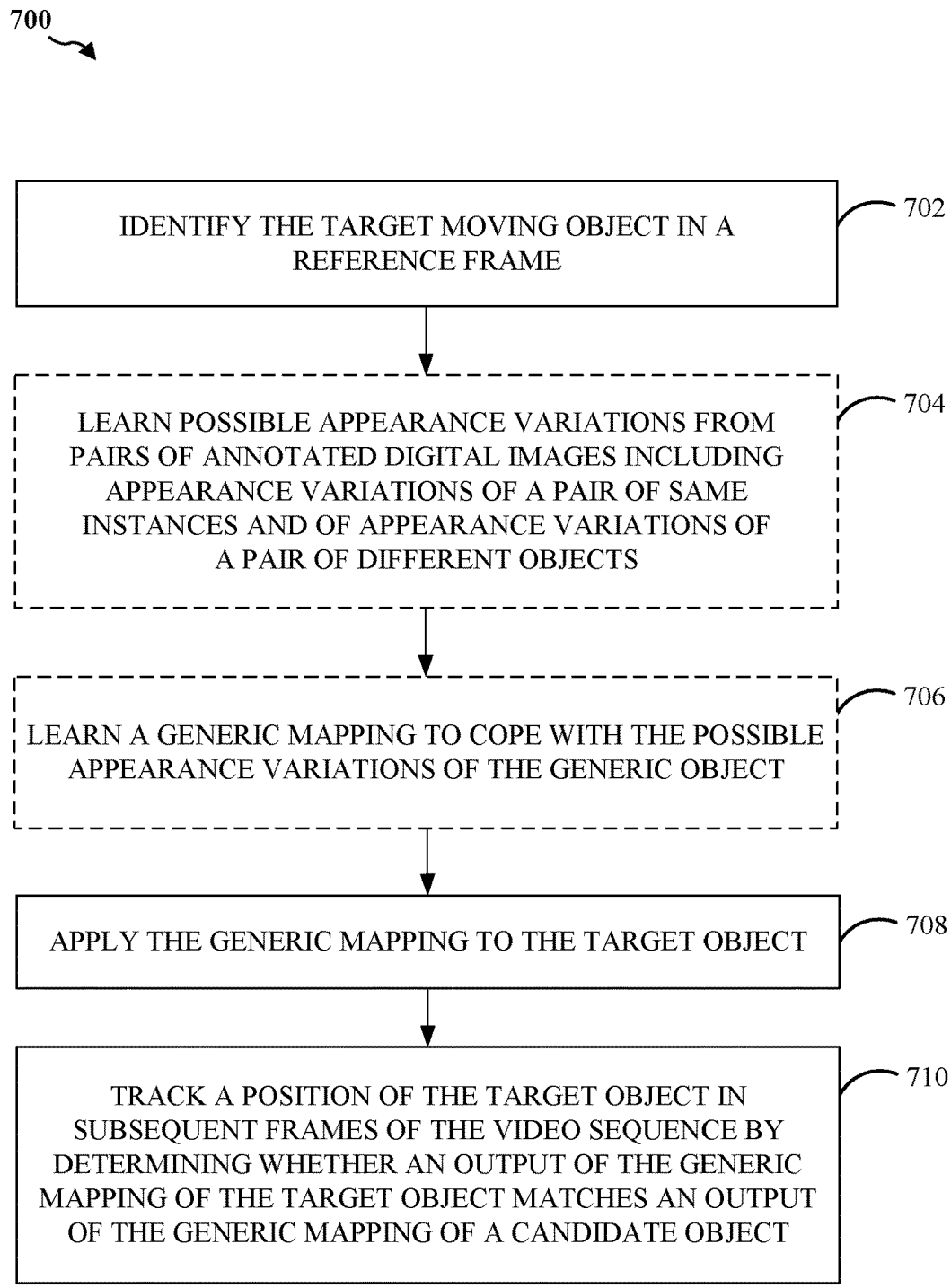
FIG. 7 illustrates a method for feature extraction according to aspects of the present disclosure.

FIG. 7 illustrates a method 700 for tracking a target object in a video sequence. In block 702, the process identifies the target object in a reference frame.

In some aspects, the process may optionally include training to learn possible appearance variations of an object, in block 704. The appearance variations may be learned from pairs of annotated digital images. The appearance variations may be relative to a same instances (e.g., same object or class of object) or in some aspects, may be relative to a pair of different objects (e.g., objects from different classes). In one example, the appearance variations may be learned via a neural network having a Siamese architecture for use with tracking the position of the target object in the video sequence.

Additionally, in some aspects, the process may optionally learn a generic mapping to cope with possible appearance variations of a generic object, in block 706. The generic mapping may be learned from an offline training process, and in some aspects, exclusively from an offline learning process. The training process may, for example, include offline analyzing of annotated video of objects, which may or may not include the target object.

In block 708, the process applies the generic mapping to a target object. In block 710, the process tracks a position of the target object in subsequent frames of the video sequence by determining whether an output of the generic mapping of the target object matches an output of the generic mapping of a candidate object.

In some aspects, the method 700 may be performed by the SOC 100 (FIG. 1) or the system 200 (FIG. 2). That is, each of the elements of method 700 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of adapting to appearance variations of a face, comprising:
   obtaining an image of the face in a sequence of reference frames;
   generating a generic mapping of the face to adapt to the appearance variations of the face, the generic mapping generated by learning appearance variations of the face;
   obtaining an image of the face in a subsequent frame; and
   determining an aspect of the face by determining whether features of the generic mapping of the face match features of a candidate box of a plurality of candidate boxes of the image of the face in the subsequent frame.

2. The method of claim 1, wherein determining the aspect of the face comprises determining a location of the face, and the method further comprising tracking the face based on the location.

3. The method of claim 1, wherein determining the aspect of the face comprises determining whether the features of the generic mapping of the face match features of a generic mapping of the candidate box.

4. The method of claim 1, wherein an appearance of the face in the sequence of reference frames is different from an appearance of the face in the subsequent frame.

5. The method of claim 1, further comprising generating the generic mapping by learning the appearance variations during an offline training stage.

6. The method of claim 5, further comprising learning appearance variations of objects different from the face during the offline training stage.

7. The method of claim 1, wherein the generic mapping is generated via an artificial neural network having a Siamese architecture.

8. An apparatus for adapting to appearance variations of a face, the apparatus comprising:
   a memory; and
   at least one processor coupled to the memory, the at least one processor configured:
   to obtain an image of the face in a sequence of reference frames;
   to generate a generic mapping of the face to adapt to the appearance variations of the face, the generic mapping generated by learning appearance variations of the face;
   to obtain an image of the face in a subsequent frame; and
   to determine an aspect of the face by determining whether features of the generic mapping of the face match features of a candidate box of a plurality of candidate boxes of the image of the face in the subsequent frame.

9. The apparatus of claim 8, wherein the at least one processor is further configured:
   to determine the aspect of the face by determining a location of the face; and
   to track the face based on the location.

10. The apparatus of claim 8, wherein the at least one processor is further configured to determine the aspect of the face by determining whether the features of the generic mapping of the face match features of a generic mapping of the candidate box.

11. The apparatus of claim 8, wherein an appearance of the face in the sequence of reference frames is different from an appearance of the image of the face in the subsequent frame.

12. The apparatus of claim 8, wherein the at least one processor is further configured to generate the generic mapping by learning the appearance variations during an offline training stage.

13. The apparatus of claim 12, wherein the at least one processor is further configured to learn appearance variations of objects different from the face during the offline training stage.

14. The apparatus of claim 8, wherein the generic mapping is generated via an artificial neural network having a Siamese architecture.

15. A non-transitory computer-readable medium having program code recorded thereon for adapting to appearance variations of a face, the program code executed by a processor and comprising:
  program code to obtain an image of the face in a sequence of reference frames;
  program code to generate a generic mapping of the face to adapt to the appearance variations of the face, the generic mapping generated by learning appearance variations of the face;
  program code to obtain an image of the face in a subsequent frame; and
  program code to determine an aspect of the face by determining whether features of the generic mapping of the face match features of a candidate box of a plurality of candidate boxes of the image of the face in the subsequent frame.

16. The non-transitory computer-readable medium of claim 15, wherein the program code to determine the aspect of the face further comprises program code to determine a location of the face, and the program code further comprises program code to track the face based on the location.

17. The non-transitory computer-readable medium of claim 15, wherein the program code to determine the aspect of the face further comprises program code to determine whether the features of the generic mapping of the face match features of a generic mapping of the candidate box.

18. The non-transitory computer-readable medium of claim 15, wherein an appearance of the face in the sequence of reference frames is different from an appearance of the image of the face in the subsequent frame.

19. The non-transitory computer-readable medium of claim 15, further comprising program code to generate the generic mapping by learning the appearance variations during an offline training stage.

20. The non-transitory computer-readable medium of claim 19, further comprising program code to learn appearance variations of objects different from the face during the offline training stage.

21. The non-transitory computer-readable medium of claim 15, wherein the generic mapping is generated via an artificial neural network having a Siamese architecture.

* * * * *